106. COMPOSITIONS, COATING OR PLASTIC.

98

508,033

ALOYS MÖHLE, OF MALSTATT, NEAR SAARBRÜCKEN, GERMANY.

COMPOUND FOR ARTIFICIAL STONE.

SPECIFICATION forming part of Letters Patent No. 508,033, dated November 7, 1893.

Application filed March 19, 1892. Serial No. 425,580. (No specimens.) Patented in France June 24, 1890, No. 206,596; in Belgium August 1, 1890, No. 91,485, and in Austria-Hungary November 28, 1890, No. 34,516 and No. 58,721.

*To all whom it may concern:*

Be it known that I, ALOYS MÖHLE, a subject of the Emperor of Germany, and a resident of Malstatt, near Saarbrücken, Germany, have invented new and useful Improvements in Compounds for Artificial Stone, (for which I have obtained Letters Patent in France, No. 206,596, dated June 24, 1890; in Belgium, No. 91,485, dated August 1, 1890, and in Austria-Hungary, No. 34,516 and No. 58,721, dated November 28, 1890,) of which the following is a specification.

Artificial building and facing-stones as heretofore made of cement and furnace slag were frequently found unreliable and apt to crumble. It has in fact not been possible previous to my invention, to obtain of cement and slag, a composition which would fairly resemble natural stones and at the same time have the same strength and power of resistance. After repeated experiments, I have found that a thoroughly satisfactory result is obtained if sand and sandstone (chips) are finely powdered together and then mixed with finely powdered sulphureted furnace-slag, to which a small quantity of cement mixed with carbonate of soda is added, so that the mixture will harden more quickly. A small quantity of water is also added to the mixture, and the whole mass is then put into molds and properly shaped. This mixture of finely ground sand, sandstone (chips), sulphureted furnace-slag and a cementing material produces an artificial stone which is an exact representation of the natural sandstone, having not only the same density, but often exceeding it. It can be made at low cost, requires only a short time to become sufficiently hardened, and has the advantage that it may easily be operated on soon after its construction.

My compound for making artificial stone is used in the following manner: Chips of sandstone together with sand are first ground to a fine powder, four parts of which mixture are then thoroughly mixed with about two parts of finely granulated sulphureted furnace-slag. Not every furnace-slag is suited for this purpose, but only such slag as is produced in the manufacture of pig-iron and which has, on account of its peculiar composition (being about thirty-five per cent. silicic acid, twenty-two per cent. clay and oxide of iron, forty-two per cent. lime, and a small quantity of sulphur) a great degree of resistance, and binds very well with the sandstone powder. In granulating the slag, it is of special importance that in drying it, which has hitherto been done by high heat, it should not be heated to a too high temperature, so that the sulphur contained in the slag is not driven out, as this sulphur forms an important part in the subsequent combination of the mass. In order that the artificial stone mass thus obtained may harden quickly, one part of Portland or other cement is added to six parts of the mass, and to regulate the time of hardening, one to ten per centum of carbonate of soda is added. The whole mass is then thoroughly mixed by means of rotating sieves, or analogous devices, as it is of the utmost importance, not only that all the component parts should be finely powdered, but also that their mixture be as thorough as possible. To this well-mixed mass, as much water as is necessary to make the mixture as moist as fresh earth, is added; more water being disadvantageous, as it may cause the stone to crack. The moist powder may be then placed into molds, which preferably have the profile or general configuration which the stone is to have, and the mixture is then tamped until some of the water is driven off. After lying in the molds for from one to five hours, the stones are taken out and are then still soft enough to be worked with ordinary chisels or carpenter-like tools. During this time they receive the desired finish as to shape and profile, as they can be turned in a lathe, polished or only roughly worked on, as desired. This easy shaping is only possible when the mass which is employed is in a finely ground condition; otherwise it is liable to crumble.

Perfect surface resemblance to natural stone can only be obtained by working on these artificial stones soon after they have been molded.

After about two days, the stones will have obtained such a degree of hardness that they can be worked on only with stone-mason's tools. After eight days they are even harder than natural sand-stones.

Stones constructed of my compound, which were purposely subjected to varying temperatures and different degrees of moisture, did not show the least change in color or form, nor did they crack or crumble, and retained the same hardness throughout. It is expressly repeated that these desirable results can only be obtained by employing the sulphureted furnace-slag of pig-iron, granulated, dried and finely powdered.

Having now described my invention, what I claim is—

A composition for artificial stone, comprising sulphureted slag, brick dust, waste sand-stone, sand, cement, and carbonate of soda, substantially as described.

In testimony whereof I have signed my name to this specification in the presence of two subscribing witnesses.

ALOYS MÖHLE.

Witnesses:
 FRANZ HASSLACHER,
 FRIEDRICH QUEHL.